United States Patent Office 2,937,088
Patented May 17, 1960

2,937,088

DIETHYLENE GLYCOL MIXED ESTERS

Glen G. Gray and Orris D. Hawks, Rochester, N.Y., assignors to Eastman Kodak Company, Rochester, N.Y., a corporation of New Jersey No Drawing. Application January 13, 1958
Serial No. 708,359

8 Claims. (Cl. 96—94)

This invention relates to the incorporation in gelatin coating compositions, particularly in photographic emulsions, of a diethylene glycol mixed ester to improve the physical characteristics of the gelatin composition.

In the coating of gelatin layers or photographic emulsion layers upon supports therefor there are two problems which confront the photographic industry, namely (1) supports which are coated on one side only with layers of gelatin or photographic emulsion show a tendency to curl, which is thought to be due to the high stress developed by gelatin as it dries from one moisture content to a lower moisture content and (2) the tendency of a photographic emulsion layer to crack when it is flexed, especially at low humidities. Several materials have been suggested for incorporation in gelatin compositions to improve the characteristics of the gelatin when employed as a layer in the manufacture of a photographic product.

One object of our invention is to prepare gelatin compositions having greatly improved properties in that coatings thereof do not exhibit high stresses at low humidities and exhibit little or no cracking when flexed. Another object of our invention is to provide gelatin coating compositions which penetrate little, if any, into a paper support when applied thereto. A further object of our invention is to provide compositions, which when used as layers in photographic products, exhibit not more than a minimum tendency to curl as compared with gelatin compositions generally. A still further object of our invention is to provide compositions of gelatin containing therein mixed esters of diethylene glycol, one acyl of which is a lower fatty acid radical and the other a dicarboxylic acid radical. Other objects of our invention will appear herein.

To carry out our invention there is mixed with the gelatin composition the material which is obtained from esterifying diethylene glycol to impart both dicarboxylic acid groups and monocarboxylic acid groups thereto. This additive is prepared in such a manner that the product consists predominantly of the mixed ester of diethylene glycol and polymerization of the diethylene glycol is limited. This involves the selection of the most desirable fractions in the preparation of the material to be added to the gelatin. Esters of diethylene glycol of the type which are useful in preparing gelatin compositions in accordance with our invention are diethylene glycol acetate succinate, diethylene glycol acetate phthalate, diethylene glycol acetate diglycollate, diethylene glycol acetate maleate, diethylene glycol propionate succinate, and the like.

Material which is useful for employment in preparing compositions in accordance with our invention may be prepared as follows: 10 kilograms (107 moles) of diethylene glycol was added to 10.7 liters of pyridine and the mass was warmed to 40° C. There was slowly added thereto 10.36 kilograms (107 moles) of succinic anhydride. The temperature of the mass was raised to 90° C. and it was held for 1 hour at this temperature. The pyridine was then distilled off by means of a vacuum distillation and the product which weighed 20.8 kilograms was transferred to a molecular still and distilled to obtain several fractions and a residue. The maximum temperatures for each fraction, the pressures used in the molecular distillation, and the kilograms of each fraction obtained are as follows:

| No. | Temp. °C. | Pressure (µ) | Net Kgs. | Color |
|---|---|---|---|---|
| Input | | | 20.27 | |
| 1 | 110 | 150 | .35 | Yellow. |
| 2 | 130 | 150 | 1.41 | Do. |
| 3 | 140 | 100 | .91 | Do. |
| 4 | 150 | 125 | .99 | Do. |
| 5 | 170 | 110 | .86 | Do. |
| 6 | 180 | 110 | .30 | Brown. |
| Residue | | | 13.25 | Dk. Brown. |

Fractions 2, 3, 4 and 5 weighing altogether 4.17 kilograms were mixed together. The mixture was dissolved in 4.17 kilograms of pyridine and warmed to 35° C. 2.25 kilograms of acetic anhydride were slowly added in 250 cc. portions, reaction occurred and the temperature rose during the reaction to approximately 67° C. After the acetic anhydride had been added, the temperature was raised to 80° C., and held for 1 hour. The acetic acid formed and the pyridine were both removed by vacuum distillation. The product weighing 4.5 kilograms was distilled in a molecular still. The maximum temperatures for the removal of each fraction, the pressures and the weight of product obtained were as follows:

| No. | Temp. °C. | Pressure | Net Kgs. | Color |
|---|---|---|---|---|
| Input | | | 4.50 | |
| 1 | 100 | 50 | .453 | Yellow. |
| 2 | 160 | 20 | 2.84 | Cloudy. |
| 3 | 180 | 20 | .63 | Brown. |
| Residue | | | .92 | Do. |

Analysis of fraction 2 indicated that material contained 55–60% of diethylene glycol monoacetate monosuccinate, 30–35% of diethylene glycol diacetate and 5–10% of diethylene glycol disuccinate.

In the above procedures, the polymerized material primarily resided in the residue which was discarded, both the residue obtained before end of the succination step and that obtained at the end of the acetylation step, leaving as the material for addition that having little or no polymerization but in which the diethylene glycol is predominantly esterified with both a dicarboxylic acid radical and a lower fatty acid radical in predominant proportions therein. The purpose in preparing the material is to obtain the mixed ester of diethylene glycol having substantially equal numbers of lower fatty acid and dicarboxylic acid groups and to keep polymerization to a minimum. It will be understood that a certain amount of variation in the proportions of acyl and dicarboxylic acid radicals in the additive may be tolerated.

In its broadest aspects, the invention involves incorporating from 25% up to 200% of the diethylene glycol ester composition in which the mixed ester predominates into a gelatin composition (the proportion of ester being based on the weight of dry gelatin).

The following examples illustrate our invention:

(1) 20 grams of diethylene glycol acetate succinate having substantially equal numbers of acetyl and succinic groups were added to 470 grams of a photographic emulsion of the medium contrast, warmed toned, enlarging speed silver chlorobromide-gelatin type after the emulsion had first been melted or liquefied. This amount of diethylene glycol acetate succinate was equal to 60% of the gelatin present in the emulsion. This emulsion was compared with a regular photographic emulsion without dilution and with a regular emulsion in which 20 grams of water were added per 470 grams of emulsion. The materials were applied to a baryta coated paper base. The emulsion flow was adjusted to that most suitable for use in the coating apparatus to obtain normal silver-gelatin coverage. The support was a paper base weighing 27 pounds per 1,000 square feet over which was coated a clay layer at 55 grams per square meter. The following tables give the results in which the coatings were applied to the paper support in the quantities indicated.

Coatings were made as described and were tested. The results obtained were as follows:

| Identity | Preprocess Cracking | Preprocess Curl | |
|---|---|---|---|
| | | 18% R.H. | 18% R.H. after 70% |
| Comparison | 9 | 3.1 | 9.0 |
| Emulsion with diethylene glycol acetate succinate added | 0 | 0.2 | 2.3 |
| Comparison plus water in an amount equal to the diethylene glycol acetate succinate | 20 | 2.3 | 9.6 |

The material may be incorporated in either an aqueous gelatin composition with or without dyes or it may be incorporated into silver halide photographic emulsions in which gelatin is employed as the carrier for the silver halide particles. After such composition is prepared it may be coated out onto either film base such as has been subbed or as the final sensitized layer of a photographic product. If desired, other compatible materials may be incorporated in the compositions such as dyes or coloring matters or pigments such as barium sulfate or the like. The gelatin coating composition may be applied to film support or paper, either that which has been previously treated or it may be applied directly to the support such as to a paper base.

The curl of a coated dried paper is determined by first taking the samples and conditioning for 12 hours at 50% R.H. After conditioning at this R.H., 10 discs of the paper 10 centimeters in diameter are punched and placed emulsion side up on a cheese cloth rack in rooms conditioned to 18% R.H. The discs are conditioned at this R.H. for 12 hours whereupon the distances of the discs are measured and subtracted from 10 centimeters thus indicating the distance between the upturned edges and the curl value. Increased amounts of curl are evidenced by increased numerical values. After measurement at 18% R.H. the discs are moved to a humidity of 50–70% R.H. where they are conditioned and then again placed in 18% R.H. where they are conditioned and then again placed in 18% R.H. for measurement. This procedure simulates humidity conditions under day-night variations. The 18% curl test is then repeated.

The cracking or brittleness test is carried out by taking suitable samples of coatings obtained after drying but before photographic processing and cutting into 15 mm. width strips. The strips are conditioned for 12 hours at 18% R.H. and then are placed over a ¾ inch mandrel under 500 grams tension. After flexing, the surface of the strips is wiped with a dilute dye solution to make cracks in the emulsion easy to count.

*Example 2*

Diethylene glycol acetate succinate ester and/or water as indicated were added to 470 grams of a medium contrast, enlarging speed, warm-toned silver halide-gelatin photographic emulsion after it had been liquefied. The amounts of the ester used correspond to 30% and 60% of the gelatin present in the emulsion. Emulsion flow was adjusted on all parts to obtain normal gelatin and silver coverage. The emulsion was coated on a baryta coated paper support, the paper being at the basis weight of 27 pounds per 1,000 square feet and the baryta at 55 grams per square meter. Various fractions of diethylene glycol ester were used with the following results:

| Identity | Addition to 470 gms. | | Emulsion Alcohol, gms. | Preprocess Cracking | Preprocess Curl—18% R.H. | |
|---|---|---|---|---|---|---|
| | Plasticizer, gm. | H₂O, gm. | | | 18% R.H. | after 70% |
| Comparison | | | | 11 | 5.6 | 8.8 |
| DGMAMS:¹ | | | | | | |
| Fraction 1 | 10 | 20 | | 1 | 1.3 | 10.9 |
| Do | 20 | 10 | | 0 | 1.3 | 11.2 |
| Fraction 2 | 10 | 20 | | 4 | 0.9 | 6.8 |
| Do | 20 | 10 | | 0 | 0.4 | 4.4 |
| Fraction 3 | 10 | 20 | | 2 | 1.4 | 8.8 |
| Do | 20 | 10 | | 4 | 1.1 | 7.6 |
| Residue | 10 | 20 | | 5 | 2.4 | 9.5 |
| Do | 20 | 10 | | 1 | 2.7 | 8.5 |
| Do | 20 gm. (in.) | | 10 | 2 | 2.1 | 8.1 |
| Comparison | | 30 | | 11 | 4.6 | 9.5 |

¹ DGMAMS is abbreviation for diethylene glycol monoacetate monosuccinate and designates emulsion containing this additive.

*Example 3*

Diethylene glycol acetate succinate in accordance with our invention and/or water as indicated in the following table was added to 470 grams of a medium gelatin-silver chlorobromide type, cold-tone photographic emulsion after it had been liquefied. The quantities of plasticizer added amounted to 30% and 60% of the gelatin present in the emulsion. The emulsion was coated onto paper with a basis weight of 27 pounds per 1,000 square feet and coated with baryta at 55 grams per square meter. The emulsion flow was adjusted on all parts to obtain normal gelatin and silver coverage. The results obtained are indicated by the following table:

| Identity | Addition to 470 gm. Emulsion | | Pre-Process Cracking | Preprocess Curl—18% R.H | |
|---|---|---|---|---|---|
| | Plasticizer, grams | Water, gms. | | 18% RH | after 70% |
| Comparison | | 10 | 8 | 2.2 | 4.3 |
| Do | | 20 | 9 | 1.8 | 3.3 |
| DGMAMS:¹ | | | | | |
| Fraction 1 | 10 | | 0 | 0.6 | 3.8 |
| Do | 20 | | 1 | 0.3 | 3.4 |
| Fraction 2 | 10 | | 1 | 0.6 | 3.6 |
| Do | 20 | | 0 | 0.6 | 1.2 |
| Fraction 3 | 10 | | 1 | 0.7 | 3.5 |
| Do | 20 | | 0 | 0.5 | 3.1 |
| Residue | 10 | | 4 | 1.3 | 4.4 |
| Do | 20 | | 3 | 1.3 | 5.3 |

¹ DGMAMS is abbreviation for diethylene glycol acetate succinate and designates emulsion containing this additive.

Example 4

20 grams of diethylene glycol mixed ester and/or water as indicated were added to 470 grams of high contrast gelatin-silver chloride type emulsion after it had been liquefied. The amount of ester used amounted to 70% of the gelatin present in the emulsion. The paper support was non-pigment coated. The flow of emulsion applied to the paper was adjusted to give normal coverage for both gelatin and silver. The results obtained are as follows:

| Identity | Preprocess Curl, One month age | | Three Months, 18% R.H | Half Clears |
|---|---|---|---|---|
| | 18% R.H | 18% after 50% R.H | | |
| Comparison | 14.6 | 16.2 | 20 plus | No fog. |
| Comp. plus water | 15.6 | 18.0 | 20 plus | Do. |
| DGMAMS, Fraction 1 | 5.3 | 9.4 | 11.6 | Do. |
| DGMAMS, Fraction 2 | 0.3 | 0.3 | 1.5 | Do. |

The evaluation of fog half clears was run by taking standard size sheets such as 8 by 10 which had not been exposed to light but were handled under safe lights in which operation ½ of each sheet is dipped into photographic developer for the prescribed time following which the sheet is immersed in a stop bath, a fixing bath, and wash water in the usual manner for developing photographic paper. After drying, the two sections of the sheet are compared for silver density. Any density that appears in the developed portion can be attributed to chemical fogging because of the photographic activity of the additive to the emulsion.

Example 5

20 grams of diethylene glycol mixed ester or water as indicated was added to 470 grams of a high contrast gelatin-silver chloride type photographic emulsion after it had been liquefied. The amount of ester used amounted to 70% of the gelatin in the emulsion, the emulsion was coated on non-pigment coated paper base having a base weight of 20½ pounds per 1,000 square feet. The emulsion flow was adjusted to obtain normal gelatin and silver coverage. The products obtained in every case were tested and the results obtained are given in the following table:

| Identity | Preprocess Curl (2 weeks) | | Half Clears |
|---|---|---|---|
| | 18% R.H. | 18% after 50% | |
| Comparison | 19.0 | 19.3 | No Fog. |
| Comp. plus water | 18.6 | 18.9 | Do. |
| DGMAMS,[1] Fraction 2 | −0.4 | 0.0 | Do. |

[1] DGMAMS is the abbreviation for diethylene glycol monoacetate monosuccinate esters and designates here the emulsion containing that additive.

A procedure quite useful for the preparation of diethylene glycol mixed esters which are useful in preparing compositions in accordance with our invention is as follows: 176 pounds (750 moles) of diethylene glycol was added to 2.2 pounds of pyridine and warmed to 40° C. There was then slowly added to the mixture 42 pounds (190 moles) of succinic anhydride. The temperature was raised to 90° C., and held for 1 hour. The excess pyridine was removed from the mass by means of vacuum. 59 kilos of this reaction product were transferred to a 14 inch molecular still and the excess diethylene glycol was stripped off. There was obtained from this distillation 17.6 kilos of stripped residue. The diethylene glycol monosuccinate thus obtained was acetylated using a 7% molar excess of acetic anhydride and 200 ccs. of pyridine as the catalyst by adding the acetic anhydride slowly to the mass, whereupon the temperature rose during the acetylation. The esterification product was degassed under vacuum and the degassed product was transferred to a 14 inch molecular still for final distillation. The distillation results are shown in the following table:

| Fraction | Temp., °C. | Pressure | Kgs. Net Wt. | Percent cut |
|---|---|---|---|---|
| 1 | 100 | 150 | .83 | 3.8 |
| 2 | 120 | 10 | 4.69 | 21.7 |
| 3 | 135 | 9 | 3.76 | 16.9 |
| 4 | 195 | 9 | 4.45 | 20.6 |
| Residue | | | 4.66 | 21.6 |

The fractions which were of greatest interest for preparing compositions in accordance with our invention were fractions 2, 3 and 4. The over all yield in the distillation pay cut of the mixed ester was approximately 80%.

It is, of course, understood that diethylene glycol esters suitable for use in our invention may be prepared in other ways such as by the use of acid chlorides in suitable processes. Our invention includes the use of any of the mixed esters of diethylene glycol or the diethylene glycol acylate dicarboxylates. For instance, suitable monobasic acids have the formula $$CH_3(CH_2)_{n_1}COOH$$

and suitable dicarboxylic acids have the formula $$HOOC(CH_2)_{n_2}COOH$$

where $n_1$ represents 0–8 and $n_2$ 1–8. The amount of diethylene glycol ester employed may vary from 25% to approximately 200% based on the gelatin, varying with different types of photographic products and the amount of plasticization which is desired.

We claim:

1. A composition comprising gelatin containing therein 25–200%, based on the weight of the gelatin, of a diethylene glycol mixed ester composition the major portion of which has the formula:

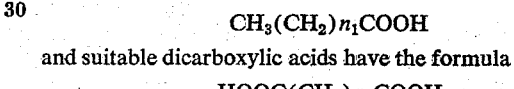

where X is an acyl radical having the formula $$CH_3(CH_2)_{n_1}CO-$$

$n_1$ being 0–8, and Y is selected from the group consisting of $-C_2H_4-$,

$-CH=CH-$ and $-CH_2-O-CH_2-$.

2. A composition comprising gelatin containing therein a diethylene glycol ester composition the major portion of which has the formula:

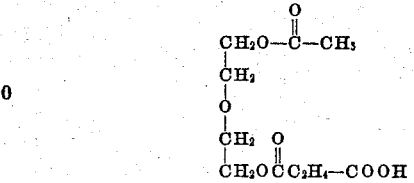

3. A composition comprising gelatin containing therein a diethylene glycol ester composition the major portion of which has the formula:

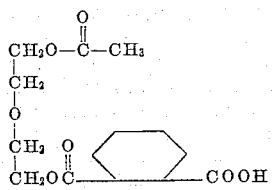

4. A composition comprising gelatin containing therein a diethylene glycol ester composition the major portion of which has the formula:

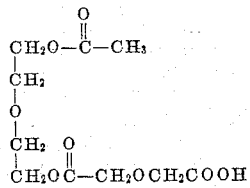

5. A composition comprising gelatin containing therein a diethylene glycol ester composition the major portion of which has the formula:

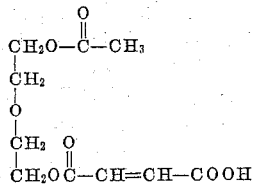

6. A composition comprising gelatin containing therein a diethylene glycol ester composition the major portion of which has the formula:

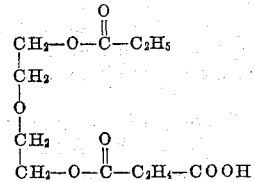

7. A composition comprising a gelatin-silver halide photographic emulsion containing therein 25–200%, based on the weight of the gelatin, of a diethylene glycol ester composition the major portion of which has the formula:

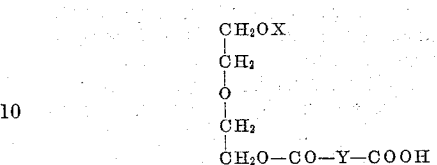

in which formula X is an acyl radical having the formula $CH_3(CH_2)_{n_1}CO-$, $n_1$ being 0–8 and Y is selected from the group consisting of $-C_2H_4-$,

$-CH=CH-$ and $-CH_2OCH_2-$.

8. A composition comprising a gelatin-silver halide photographic emulsion containing therein 25–200%, based on the weight of the gelatin, of a diethylene glycol mixed ester composition the major portion of which has the formula:

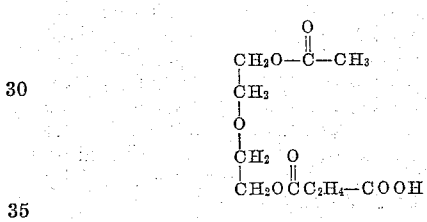

References Cited in the file of this patent
UNITED STATES PATENTS

| | | |
|---|---|---|
| 2,376,005 | Potter et al. | May 15, 1945 |
| 2,388,164 | Loder | Oct. 30, 1945 |